United States Patent [19]

Denker

[11] Patent Number: 5,034,088
[45] Date of Patent: Jul. 23, 1991

[54] BAND WHEEL AND TENSION CONTROL

[75] Inventor: Stanley D. Denker, New Richmond, Wis.

[73] Assignee: Doboy Packaging Machinery, Inc., New Richmond, Wis.

[21] Appl. No.: 438,253

[22] Filed: Nov. 16, 1989

[51] Int. Cl.$^5$ .............................................. B65G 23/44
[52] U.S. Cl. .................... 156/555; 100/93 RP; 198/813; 425/363; 425/367; 425/371; 474/136; 474/101; 474/110; 474/137; 92/117 R
[58] Field of Search ................. 156/555, 583.1, 583.5; 100/93 RP, 151, 154; 198/813, 814, 815, 816; 425/363, 367, 371, 372; 474/136, 101, 109, 110, 137; 92/117 A, 117 R

[56] References Cited

U.S. PATENT DOCUMENTS

| | | | |
|---|---|---|---|
| 2,675,053 | 4/1954 | Clemens | 156/583.5 X |
| 3,147,168 | 9/1964 | Bateman | 156/583.5 X |
| 3,329,561 | 7/1967 | Rojecki et al. | 198/813 X |
| 3,663,340 | 5/1972 | Ross | 156/555 |
| 3,741,026 | 6/1973 | Franzen | 474/110 X |
| 3,852,012 | 12/1974 | Pfeiffer | 425/363 |
| 3,993,426 | 11/1976 | Ahrweiler et al. | 425/371 |
| 4,004,963 | 1/1977 | Denker | 156/583 |
| 4,202,721 | 5/1980 | Roberts | 156/358 |
| 4,284,192 | 8/1981 | Taylor | 198/813 |
| 4,316,411 | 2/1982 | Keaton | 156/583.5 X |
| 4,362,593 | 12/1982 | Grevich | 156/498 |
| 4,584,936 | 4/1986 | Crandall et al. | 100/151 X |
| 4,615,758 | 10/1986 | Held | 156/555 X |
| 4,726,871 | 2/1988 | Hüsges et al. | 156/389 |
| 4,751,805 | 6/1988 | Walter | 53/168 |
| 4,816,114 | 3/1988 | Held | 156/555 |
| 4,824,354 | 4/1989 | Keaton | 156/555 X |
| 4,844,766 | 7/1989 | Held | 156/555 X |
| 4,898,080 | 2/1990 | Lieberman | 92/117 A |
| 4,922,805 | 5/1990 | Beswick | 92/117 R |

Primary Examiner—William A. Powell
Assistant Examiner—J. Sells
Attorney, Agent, or Firm—Haugen and Nikolai

[57] ABSTRACT

An improved mounting for spaced band wheels about which the sealing bands of a band sealer move is achieved by mounting at least one of the band wheels carrying each band from a double ended cylinder movable longitudinally with respect to the inter-band wheel distance to thereby allow adjustability in the distance between the drive and idler band wheels and, in turn, modulate the tension in the band and with the shortest wheel distance allow easy removal and replacement of the band.

17 Claims, 2 Drawing Sheets

BAND WHEEL AND TENSION CONTROL

BACKGROUND OF THE INVENTION

1. Field of the Invention

The present invention relates generally to package sealing machinery of the band sealer type used for creating a seal across the top of a filled plastic bag in which heating and cooling bars are disposed on opposite sides of a pair of spaced, continuous, moving bands which are maintained to encompass drive and idler band wheels. The bands in turn transport bags to be sealed by the application of heat and pressure as they pass between the bars. More sequentially particularly, the present invention relates to controlling the tension of the bands by controlling the position of the band wheels about which the sealing bands move.

2. Description of the Related Art

Sealing machines of this class to which the present invention pertains employ a pair of continuous bands made of steel, fiberglass or other similar materials, which are arranged to travel in the same direction in confronting parallel relation with each other along a sealing run. The film laminae or other layers of plastic material of interest to be sealed together travel sequentially along the sealing run between the bands and the seal is made by a simultaneous application of controlled heat and pressure to the laminae as it is carried between the bands along the sealing path. If desired, additional support for the material to be sealed as by the provision of a pair of continuous chains also arranged to travel in the same direction in spaced confronting parallel relation and at the speed of the sealing bands. Generally, each bag, to be sealed is inserted at the machine's inlet end and, is pinched between the bands and transported past heating and cooling heat transfer members on opposite sides of the band through the machine to a discharge point which may connect to a continuous conveyor or other automated mechanism in a well-known manner.

At least one pair of bars or platens flanking the continuous bands are used to apply the heat and pressure to seal the laminae as it travels along the path. It will be appreciated that the heat transfer bars or platens must remain close to the travelling band but must make some allowance for aberrations in thickness of the laminae of film material to be sealed which travels therebetween. In addition, ample room has to be made available such that thicknesses of material even greater than anticipated, such as those caused by wrinkles or other multiple thicknesses does not produce jamming of the machine during high speed operation.

The jamming problem has been partially addressed by attempts to control the pressure exerted by the heat transfer bars and also by allowing a certain amount of relative pivotal motion of the bars to accommodate unusually thick specimens. However, prior to the present invention there has been no direct method of continuously controlling the tension of the belts in a manner which cooperates with the sealing process to aid in coping with aberrations in the material being processed. In addition, an easier way to change belts in the system has long been desired. In the past, the band wheels were mechanically cammed or held in place with springs which had to be released so that the wheel could be moved toward each other so that the old belt could be slipped off and the new slipped on. This was a time consuming operation which resulted in increased down time in normally high speed continuously operating machines.

SUMMARY OF THE INVENTION

The present invention provides a system for both controlling and modulating band tension during operation of the band sealer and for the automatic release of tension so that each band of the band sealer can be readily changed. The invention provides for mounting the band wheels on a moveable system such that the spacing of head and tail band wheels or pulleys can be controlled automatically to thereby control belt tension. The band wheel can also be quickly moved toward each other a sufficient amount to provide for changing the belt without the need of further manual work with respect springs or operating cams.

The preferred embodiment includes a mounting system for the band wheels which incorporates a double-ended piston arrangement in which the piston is secured to the frame while its associated cylinder can move longitudinally along the piston. The system is positioned so that the direction of cylinder travel is parallel to the general path of the mounted belt. Tension in the belt or motion of each band wheel is controlled by pressure exerted by a fluid, normally air, introduced to one side or the other of the piston heads of the double-ended arrangement. While other types can be used, pneumatic or air cylinders are preferred. The band wheel or pulley is bearing mounted and fastened to the cylinder portion of the structure so that it shifts as the cylinder moves back and forth relative to the fixed piston.

Thus, in operation, to tension the belt, a fluid of controlled pressure is introduced to urge the band wheels further apart or toward the ends of the travel path of the band with a controlled or desired force. To reduce or relieve the tension such as when it is desired to replace the band, the fluid is applied to move the band wheels toward each other thus shortening the path.

In the preferred embodiment, the design is quite compact such that the pneumatic cylinder or the like used to shift the longitudinal disposition of the band wheel is disposed directly beneath the rotatable band wheel. In this manner no cylinders project beyond the periphery of the assembly which might interfere with other elements of the machine. Of course, one or both of the end band wheels or pulleys may be mounted in this manner to accomplish the desired control.

DESCRIPTION OF THE PREFERRED EMBODIMENT

Figure 1:
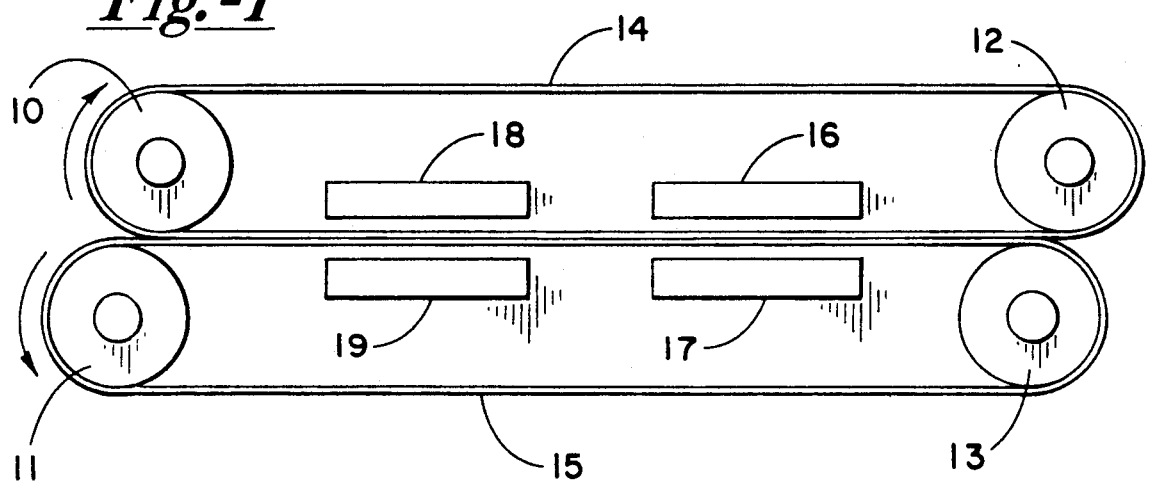
FIG. 1 is a simplified schematic showing a pair of bands operating about band wheels or pulleys which might be mounted in a machine of the class to which the present invention pertains.

A simplified schematic top view drawing of the belt drive system of a typical band sealing machine is illustrated by FIG. 1 and normally includes a pair of driving wheels 10 and 11 which are normally located at the rear or discharge end of the machine which operate with respective idler wheels 12 and 13 which are journalled for rotation at the inlet or front end of the machine. A first continuous band 14 is looped about the drive wheel 10 and its associated idler wheel 12 and a second continuous band 15 encircles the drive wheel 11 and its associated idler wheel 13. As shown by arrows in the schematic, in operation, the drive wheels 10 and 11 are driven in opposite directions and are so spaced relative to one another and to their associated intermediate idler wheels 14, if any, (not shown) such that the flights of the bands 14 and 15 are juxtaposed in close proximity to one other and travel in the same direction and at the same constant speed. The band wheels are illustrated as being staggered in FIG. 1. This arrangement normally eliminates the need for idler wheels in the machine. The open end of each bag to be sealed is fed between the end idler wheels 12 and 13 and is gripped between the two traveling bands 14 and 15 as it is carried to the left as is illustrated in the figure toward the rear or discharge end of the machine.

Heater bars 16 and 17 are provided proximate the pair of belts 14 and 15 as are chilling or cooling heat transfer members 18 and 19. FIG. 1 is a rather simplified schematic of such a system but is believed to suffice for the purposes of the present invention. If, however, more details are required for a complete or a detailed understanding of an underlying device which is typical of devices for which the present invention finds an advantageous use, such is shown in U.S. Pat. No. 4,080,241 to Grevich et al. and material required for such understanding is hereby incorporated by reference to the extent needed.

Figure 2:
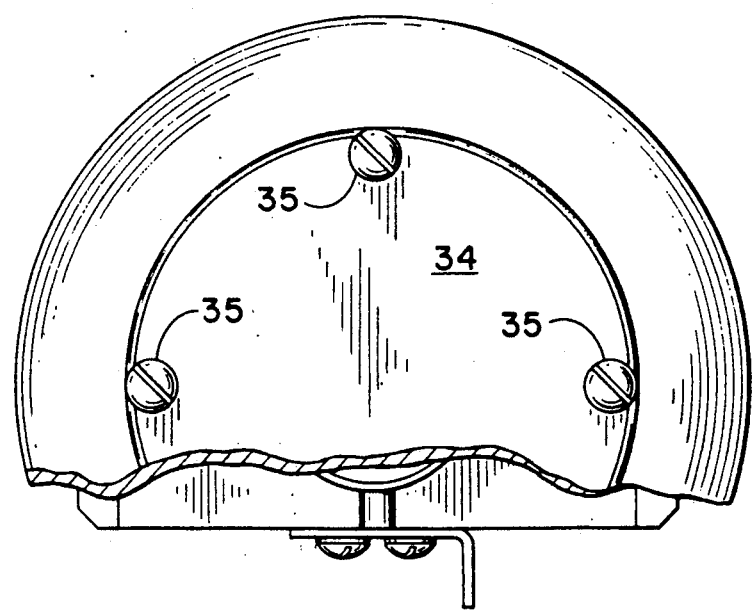
FIG. 2 is a partial top view with parts cut away which the band wheel mounting system of the invention.
Figure 3:
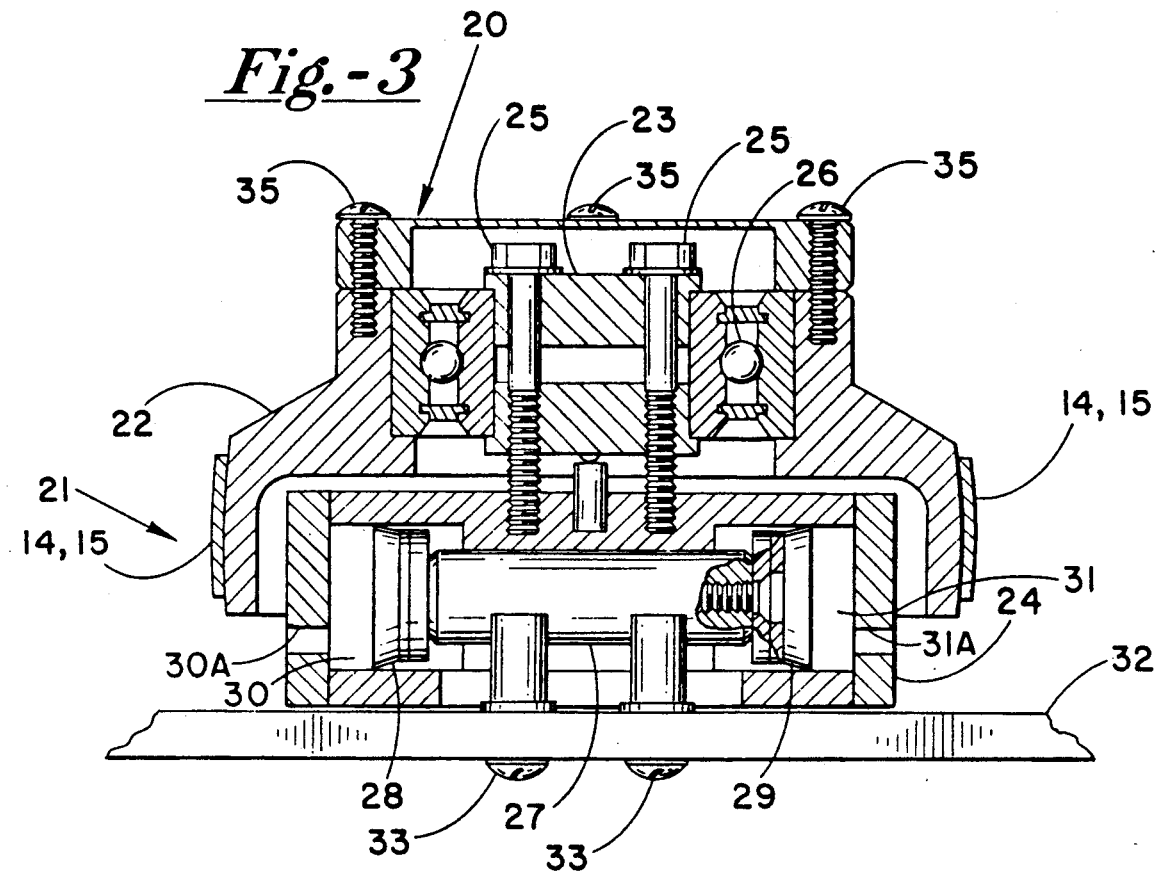
FIG. 3 is a side elevational sectional view of the band wheel mounting system of the present invention.
Figure 4:
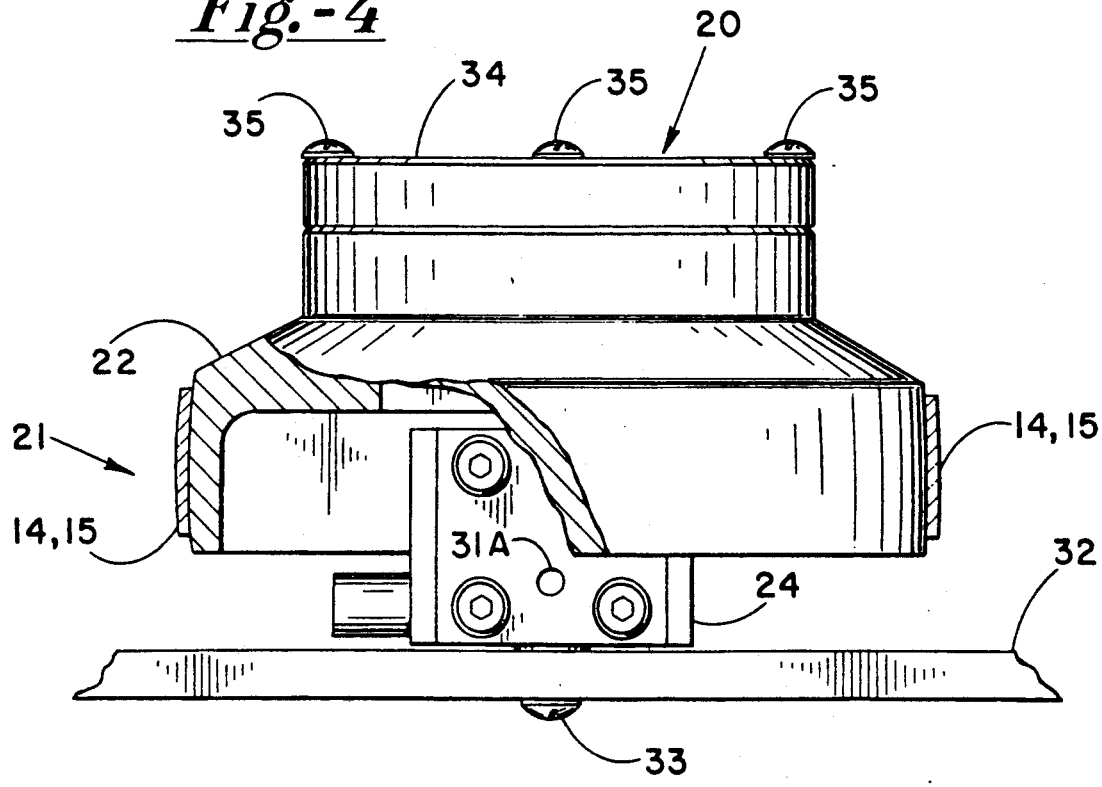
FIG. 4 is an end view, partially in section, with parts cut away, of the band wheel mounting apparatus of the invention.

FIGS. 2-4 show the band wheel tension control of the invention with FIG. 3, in particular, showing the details. A typical band wheel mounting system is shown generally at 20 in FIG. 3. This includes a wheel member 21 comprising an outer housing member 22 and an inner hub member 23. The hub member 23 is secured to a movable cylinder 24 as by fastener 25. The wheel member 22 is suitably journalled for free rotation about the hub member 23 as by a ball or roller bearing assembly shown at 26. The cylinder 24 surrounds double-ended piston arrangement having a central shaft 27 flanked by piston heads 28 and 29. Space provided for admitting and discharging air or other operating fluid into the respective areas 30 and 31 with respect to operation of the double-headed piston in the cylinder. The piston shaft 27 is fixed to a machine frame member 32 as by rigid connectors 33. A hub cap 34 secured by screws 35 is used to protect the bearing mounting from the internal environment. Sections of the belt 14 or 15 are shown as they would be mounted on the band wheel at 21. The amount of free space as shown at 30 and 31 determine the maximum linear travel for the cylinder 24. This, of course, is a matter of design choice design taking into consideration the elongation characteristics of the specific belt material, amount of room needed to change the belt and other factors concerned with the operation of the system.

It will be appreciated that in some cases both the idler band wheels and the driven or drive band wheels which are used to drive each belt can be mounted in the fashion of the invention and in other cases only the idler wheels would be made variable with the drive band wheels remaining fixed with respect to the frame. It is one distinct advantage of the invention that the amount of flexibility required can be designed into such a system utilizing the cylinder mounted, adjustable band wheels of the invention.

I claim:

1. In a band sealer having a pair of fronting endless bands, each carried by and adapted to travel about an associated set of spaced band wheels, wherein each set of band wheels includes a driven band wheel and at least one idler band wheel, the improvement comprising:

means for modulating the tension of each such endless band including fluid-operated movable cylinder means associated with and adapted to carry at least one end band wheel, wherein the cylinder is movable longitudinally with respect to the distance between end band wheels of the set of band wheels; and stationary double-ended piston member disposed within and adapted to enable displacement of the fluid-operated movable cylinder in either of two directions relative thereto to adjust the distance between the drive and end idler band wheels of each set of spaced band wheels and thereby modulate the tension in each band based on the relative fluid pressure applied to each end of the cylinder means.

2. The apparatus of claim 1 wherein the number of band wheels in a set of spaced band wheels is two.

3. The apparatus of claim 1 further comprising bearing means journalling each adjustable band wheel in free rotatable relation to a hub fixed to each movable cylinder means.

4. The apparatus of claim 2 further comprising bearing means journalling each adjustable band wheel in free rotatable relation to a hub fixed to each movable cylinder means.

5. The apparatus of claim 1 wherein each movable cylinder means is pneumatically operated.

6. The apparatus of claim 2 wherein each movable cylinder means is pneumatically operated.

7. The apparatus of claim 3 wherein each movable cylinder means is pneumatically operated.

8. The apparatus of claim 4, wherein each movable cylinder means is pneumatically operated.

9. The apparatus of claim 1 wherein both the drive and idler band wheels are mounted from movable cylinders.

10. The apparatus of claim 1 wherein the distance between the end band wheels of a set of spaced band wheels can be reduced sufficiently by operation of the movable cylinder to permit the changing of the associated band by direct removal and replacement.

11. The apparatus of claim 4 wherein the distance between the end band wheels of a set of spaced band wheels can be reduced sufficiently by operation of the cylinder to permit the changing of the associated band by direct removal and replacement.

12. The apparatus of claim 7 wherein the distance between the end band wheels of a set of spaced band wheels can be reduced sufficiently by operation of the movable cylinder to permit the changing of the associated belt by direct removal and replacement.

13. The apparatus of claim 1 wherein each means for modulating the tension on each endless band is completely contained beneath the associated band wheel.

14. In a band sealer having a pair of fronting endless bands, each carried by and adapted to travel about an associated pair of spaced band wheels, wherein each set of band wheels includes a driven band wheel and an idler wheel, the improvement comprising:

means for modulating the tension in each endless band including fluid-operated movable cylinder means associated with and adapted to carry at least one band wheel in each set mounted therefrom as an adjustable band wheel, wherein the cylinder is movable longitudinally with respect to the distance between end band wheels of the set of band wheels;

bearing means journalling each adjustable band wheel in free rotatable relation to a hub fixed to each movable cylinder means; and stationary double-ended piston member adapted to enable displacement of the fluid-operated movable cylinder in either of two directions relative thereto to adjust the distance between the drive and end idler band wheels of each set of spaced band wheels and thereby modulate the tension in each band based on the relative fluid pressure applied to each end of the cylinder means.

15. The apparatus of claim 14 wherein each movable cylinder is pneumatically operated.

16. The apparatus of claim 14 wherein each means for modulating the tension on each endless band is completely contained beneath the associated band wheel.

17. The apparatus of claim 15 wherein each means for modulating the tension on each endless band is completely contained beneath the associated band wheel.

* * * * *

UNITED STATES PATENT AND TRADEMARK OFFICE
CERTIFICATE OF CORRECTION

PATENT NO. : 5 034 088

DATED : July 23, 1991

INVENTOR(S) : Stanley D. Denker

It is certified that error appears in the above-identified patent and that said Letters Patent is hereby corrected as shown below:

In column 4, line 21, after "wheel", insert -- in each set mounted therefrom as an adjustable band wheel -- .

In column 5, line 10, after "idler", insert -- band -- .

Signed and Sealed this

Twentieth Day of October, 1992

Attest:

DOUGLAS B. COMER

*Attesting Officer*     *Acting Commissioner of Patents and Trademarks*